United States Patent [19]
Futterer et al.

[11] 3,916,236
[45] Oct. 28, 1975

[54] COLLECTOR DEVICE FOR COMMUTATOR MACHINES

[75] Inventors: Bodo Futterer, Lucerne; Herman Sigrist, Giswil, both of Switzerland

[73] Assignee: Interelectric Sachseln A.G., Switzerland

[22] Filed: May 20, 1971

[21] Appl. No.: 145,313

Related U.S. Application Data

[63] Continuation-in-part of Ser. No. 852,666, Aug. 25, 1969, abandoned.

[52] U.S. Cl. ............... 310/219; 310/231; 310/248
[51] Int. Cl. ............................................ H01r 39/00
[58] Field of Search .......... 310/40 MM, 219, 220, 310/231–237, 246, 248, 251, 252; 339/5 R, 5 S, 278 C

[56] References Cited
UNITED STATES PATENTS

| | | |
|---|---|---|
| 1,051,814 | 1/1913 | Löwendahl .................. 310/252 X |
| 2,280,135 | 4/1942 | Ward .......................... 339/278 C X |
| 2,294,482 | 9/1942 | Siegmund ..................... 339/278 C |
| 3,171,997 | 3/1965 | Hammer ....................... 310/244 X |
| 3,302,270 | 2/1967 | Grabbe ......................... 200/166 C |
| 3,370,263 | 2/1968 | Schreieck .......................... 339/5 |
| 3,511,921 | 5/1970 | Pasternak ..................... 339/278 C |

Primary Examiner—Donovan Duggan
Attorney, Agent, or Firm—Irving M. Weiner

[57] ABSTRACT

A collector device for a commutator machine, comprising a commutator having commutator segments and a metal brush, wherein the contacting surface of the commutator segments or of the metal brush is provided with a coating of between 2 and 40 microns thickness of a metal having a melting point lower than 300° C and belonging to group III to V of the periodic law.

9 Claims, 3 Drawing Figures

COLLECTOR DEVICE FOR COMMUTATOR MACHINES

This is a continuation-in-part of the co-pending application Ser. No. 852,666 of Bodo Futterer et al, filed Aug. 25, 1969, now abandoned.

BACKGROUND OF THE INVENTION

The invention relates to a collector device for commutator machines, comprising a commutator having a plurality of commutator segments and metal brushes contacting the commutator segments. Such a collector device is especially adapted for high speed direct current machines of low power.

In high speed electric commutator machines the effective life of the commutator and brushes decreases rapidly at commutator currents beyond 0.8 A due to irregular commutation.

Attempts have been made to avoid the effect of such irregular or imperfect commutation by machining the commutator surface on a lathe with a diamond. Nevertheless, it has been found, however, that commutation problems still exist which seem to originate from a certain, although tiny undulatory configuration of the surface of the commutator segments.

The applicant of the present invention has found that the unfavourable effect of the undulatory configuration of the surface of the commutator may be reduced by using a collector device comprising a commutator and a metal brush, in which the contacting surface of the commutator and/or the metal brush is coated with a metal layer of between 2 and 40 microns thickness of a metal having a low melting point. In a preferred embodiment the thickness of the coating is between 2 and 5 microns, and the beneficial effect of improved regular commutation is best at about 8 microns thickness of the coating, and diminished gradually in the range of between 20 and 40 microns thickness of the coating.

BRIEF SUMMARY OF THE INVENTION

It is an object of the invention to provide a collector means in which the unfavourable effect of the undulatory configuration of the surface of the commutator is reduced by applying a coating of the metal brushes or the commutator segments at least in the region of its contacting surface in a thickness of between 2 and 40 microns, wherein the coating cosists of a metal of a low melting point.

It is another object of the invention to provide a process for applying a coating to a collector device which is applicable to all kinds of collector devices, even if they have been in operation for a longer time.

BRIEF DESCRIPTION OF THE DRAWINGS

These and other objects of the invention will be better understood from the detailed description and drawings wherein.

DETAILED DESCRIPTION

Figure 1:
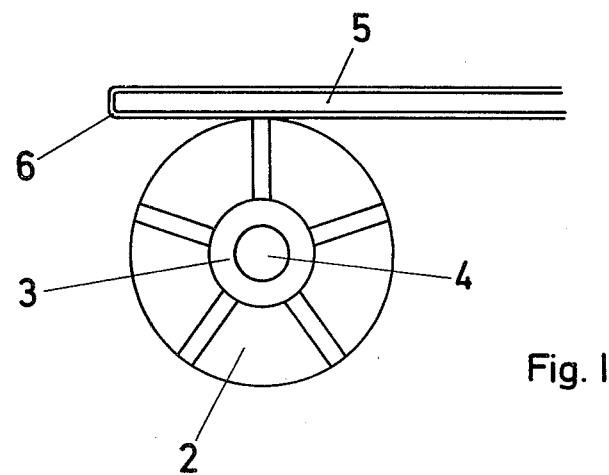
FIG. 1 shows in cross section a commutator of a high speed direct current machine and a metal brush

FIG. 1 shows in cross section the commutator 1 of a high speed direct current machine which is provided with five commutator segments 2 embedded in the insulating material of a hub 3 which is mounted on shaft 4 of the machine. The surface of the commutator is machined so as to be as round and smooth as possible. The commutator co-operates with two metal brushes 5, only one of which is shown in the drawings. The metal brush 5 has a coating 6 of, for example, tin having a thickness of 8 microns. The tin coating may be applied galvanically.

Figure 2:
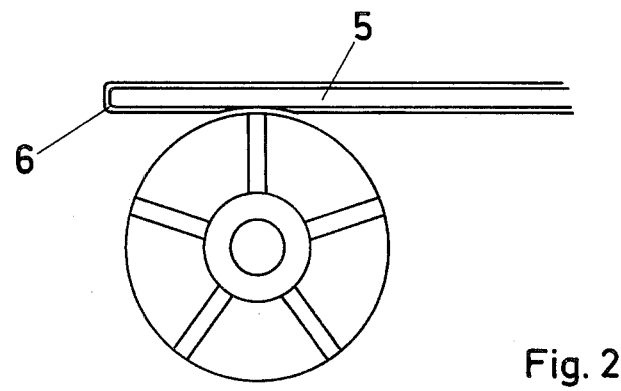
FIG. 2 shows in cross section the commutator as shown in FIG. 1 after a certain period of operation of the collector device.

FIG. 2 shows in cross section the collector device of FIG. 1 after a certain period of operation of the commutator and brush. It is shown that the tin coating has been worn up by abrasion at the area in contact with the commutator. Thus, the surface of the commutator is predominantly in contact with the basic metal of the brush 5. Only at the edge regions the tin coating is in contact with the commutator.

The collector device in accordance with the invention provides a substantially improved commutation over collector devices used hitherto. The life-time of the commutator and of the brushes have been increased several times for commutator currents higher than 0.8 A. This favourable effect is independent of the fact that the tin coating has been rubbed off at the contacting area after a short period of operation.

Tests have shown that the intended beneficial effect also occurs when the metal coating is provided only in the region of the surface of the metal brushes contacting the commutator. Thus, the advantageous effect does not appear to originate from the damping of eventual vibrations of the metal brushes.

The present invention enables the production of high speed electric miniature machines of low output and weight having a high service-life. The collector device according to the invention is particularly suitable for motors having outputs between less than one watt and 100 watts.

A quite substantial improvement of commutation performance is obtained when the metal brushes are used with a commutator the surface roughness of which is between 0.3 and 6 microns, preferably between 0.3 and 2 microns.

Figure 3:
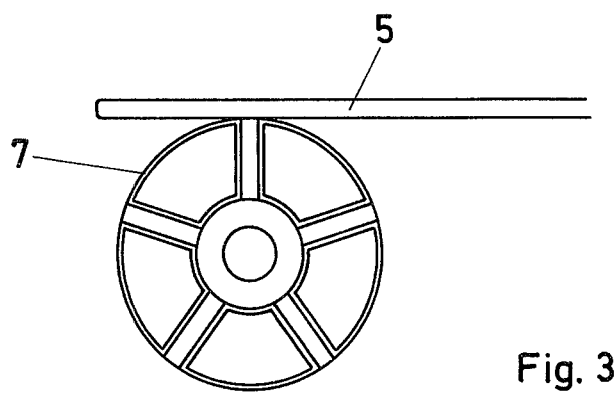
FIG. 3 shows in cross section a collector device, in which the commutator as well as the metal brush are provided with a coating according to the invention

FIG. 3 shows in cross section a collector device in which the surface of the commutator segment 2 has been provided with a coating instead of metal brushes 5. This alternative embodiment leads to an improved commutation, too, which seems to show that the advantageous effect of the invention is achieved by the presence of a metal of low melting point in the contacting zone between the metal brushes and the commutator segments.

It should be noted that the metal brushes as well as the commutator segments may be provided with a coating according the invention, although the commutation performance is not ameliorated with respect to the collector device according to FIG. 1.

Instead of tin the coating may be of a metal selected from groups III to V of the periodic table provided that the selected metal has a melting point below 300° C. It has been found that indium is a preferred metal for the coating.

The collector device according to the invention is compatible with liquids that are often used as a collector lubricant.

The method according to the invention for preparing a collector device comprises the steps of dispensing or spreading small particles of a metal of group III to V of the periodic law and having a melting point below 300°C and a particle size of less than 100 microns in a liquid and applying said liquid onto the collector device. The metal particles contained in said liquid are at least partially baked to the surface of the collector segments and/or the metal brushes at the contacting areas of the same after a short period of operation. The process according to the invention is applicable at collector machines which have not initially been provided with a coating according to the invention. Further, the said process may be repeated from time to time in order to make sure that at any time a metal coating is present in the contact area between the collector segments and the metal brushes.

It has been found that the small metal particles may be dispersed in a chemically neutral and silicon free lubricant which does not contain neither organic nor anorganic acids and which is known under the tradename DODUKONT B 10$^R$ of the Dr. E. Durwachter DODUKO KG in Pforzheim, West-Germany.

The metal particles may be present in the liquid in an amount of 10 grams per 100 grams of the liquid. The particle size is between 1 and 15 microns and the particles are dispersed in said liquid. Although such a concentration of metal particles in a liquid works well the concentration may be increased or decreased without affecting the commutation performance and the service-life of the collector device. Further, it has been found that the advantages achieved by the invention are independent of whether the liquid has volatilized or not. A miniature motor provided with a collector device having seven commutator segments arranges within a diameter of 4 mm and a width of the metal brushes of 2 mm and provided with a tin coating was operated with a commutator current of 0.8 A. The collector device had been prepared according to the process of the invention. Tests have shown a life-time of the miniature motor of 10,000 hours, whereas the life-time of an identical miniature motor, the collector device of which, however, had been prepared with a liquid lubricant not containing tin particles was merely 800 hours.

We claim:

1. A collector device for electric machines comprising a commutator having commutator segments and at least one metal brush in contact with said commutator, wherein at least one of these parts of the collector device is provided at least in the region of its contacting surface with a metal coating of between 2 and 40 microns thickness of a metal which is from Group III to Group V of the Periodic Table and having a melting point below 300°C.

2. A collector device according to claim 1, wherein the metal coating is applied to the metal brushes.

3. A collector device according to claim 1, wherein said metal coating is made of tin or indium or an alloy of tin and indium.

4. A collector device according to claim 1, wherein said coating has a thickness of between 2 and 20 microns.

5. A collector device according to claim 1, wherein said coating is a tin coating of between 5 and 8 microns thickness.

6. A collector device according to claim 1, wherein the commutator segments have a surface roughness of between 0.3 and 6 microns.

7. The method of preparing a collector device comprising a comutator having commutator segments and metal brushes in contact with the surface of said commutator segments, wherein at least one of these parts of the collector device is provided with a metal coating of between 2 and 40 microns thickness of a metal having a low melting point, comprising the steps of dispensing or spreading small particles of a metal of group III to V of the periodic law and having a melting point below 300°C and a particle size of less than 100 microns in a liquid and applying said liquid onto the collector device.

8. A method according to claim 7, wherein the metal particles are dispersed in a liquid lubricant.

9. A method according to claim 7, wherein the metal particles are prepared in a size of between 1 and 20 microns diameter.

* * * * *